(12) United States Patent
Komatsu et al.

(10) Patent No.: US 6,507,453 B2
(45) Date of Patent: Jan. 14, 2003

(54) THIN FLOPPY DISK DRIVE CAPABLE OF PREVENTING AN EJECT LEVER FROM ERRONEOUSLY OPERATING

(75) Inventors: Hisateru Komatsu, Tendo (JP); Noriyuki Kobayashi, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 148 days.

(21) Appl. No.: 09/773,342

(22) Filed: Jan. 31, 2001

(65) Prior Publication Data

US 2001/0010610 A1 Aug. 2, 2001

(30) Foreign Application Priority Data

Feb. 2, 2000 (JP) .................................. 2000-025584

(51) Int. Cl.[7] .............................................. G11B 5/016
(52) U.S. Cl. .................................................. 360/99.02
(58) Field of Search .......................... 360/99.02, 99.06; 369/75.1–75.2, 77.1–77.2

(56) References Cited

U.S. PATENT DOCUMENTS 4,772,973 A * 9/1988 Ohkita et al. ............. 360/99.02
6,137,762 A * 10/2000 Uwabo et al. ........... 369/77.02
6,437,940 B1 * 8/2002 Komatsu et al. ......... 360/99.02

* cited by examiner

Primary Examiner—Allen Cao
(74) Attorney, Agent, or Firm—Frishauf, Holtz, Goodman & Chick, P.C.

(57) ABSTRACT

In a thin floppy disk drive comprises a disk shutter arm (26), rotatably mounted on a disk holder (22), for opening and closing a shutter (43) of a floppy disk (40) and an eject lever (25), rotatably mounted on a main frame (13), having an eject stop part (253) engaged with a plate stopper portion (212) of an eject plate (21), the eject lever (25) has an eject protrusion (252a). The disk shutter arm (26) has a shutter hook part (261a) engaged with the eject protrusion so as to control a rotation operation of the eject lever when the floppy disk (40) is not inserted in the thin floppy disk drive. It is therefore possible to prevent the elect lever (25) from rotating over a predetermined rotation angle as far as the floppy disk (40) is not inserted in the thin floppy disk drive.

5 Claims, 11 Drawing Sheets

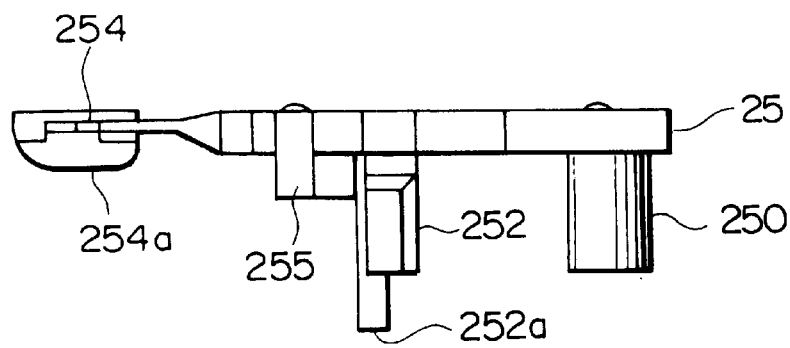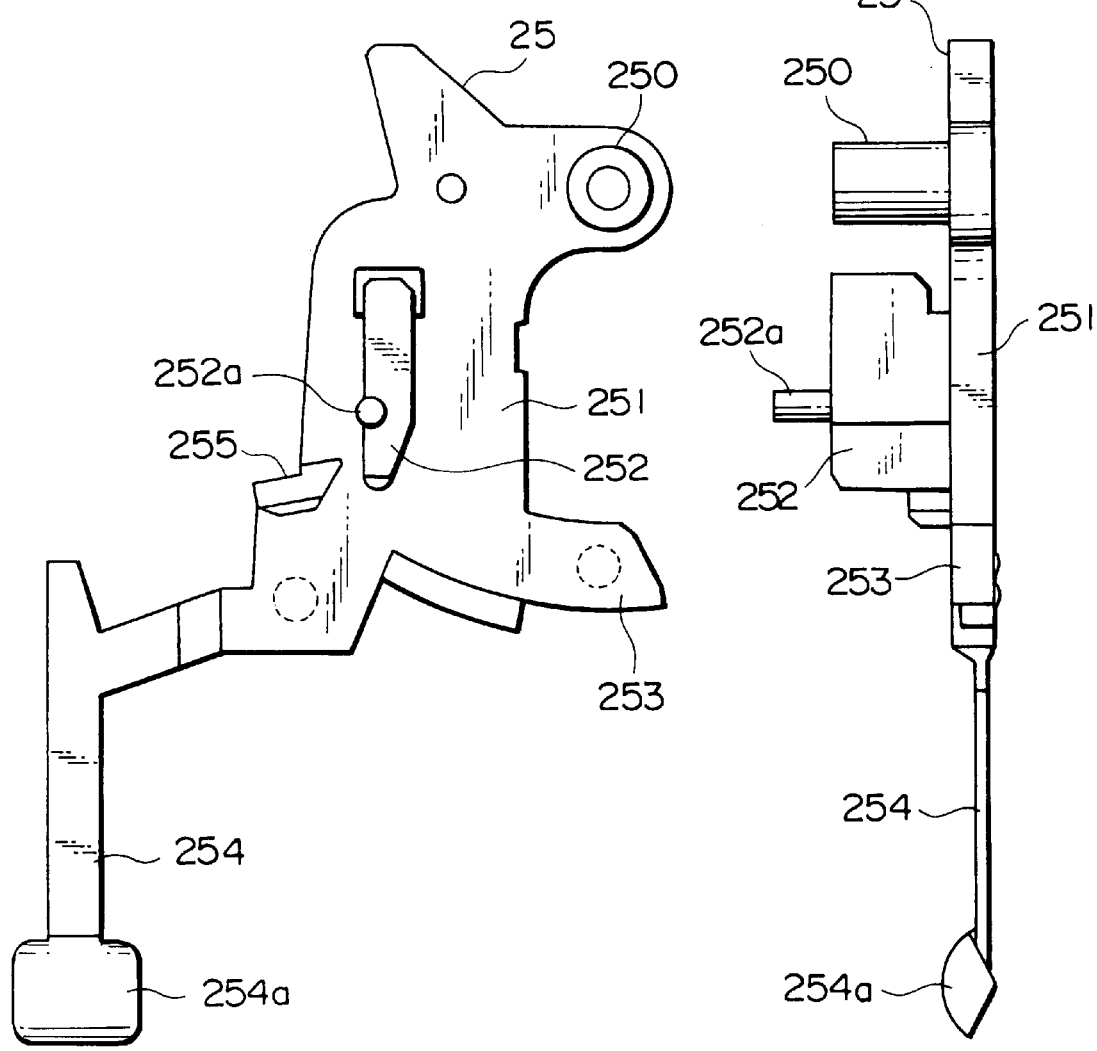
FIG.6C
FIG.6A   FIG.6B

THIN FLOPPY DISK DRIVE CAPABLE OF PREVENTING AN EJECT LEVER FROM ERRONEOUSLY OPERATING

BACKGROUND OF THE INVENTION

This invention relates to a flexible or floppy disk drive (which may be hereinafter called "FDD" for short) and, in particular, to a thin floppy disk drive comprising, as different parts, a disk shutter arm and an eject lever. The disk shutter arm is for opening or closing a shutter of a flexible or floppy disk (which may be hereinafter called "FD" for short) inserted or loaded in the thin floppy disk drive. The eject lever is for controlling a sliding operation of an eject plate.

In the manner which is well known in the art, the floppy disk drive of the type is a device for carrying out data recording and reproducing operation to and from a disk-shaped magnetic recording medium of the floppy disk loaded therein. In addition, such a floppy disk drive is mounted or loaded in a portable electronic apparatus such as a laptop personal computer, a notebook-size personal computer, a notebook-size word processor, or the like.

The floppy disk drive of the type comprises a magnetic head for reading/writing data from/to the magnetic recording medium of the floppy disk, a carriage assembly for supporting the magnetic head at a tip thereof with the magnetic head movably along a predetermined radial direction to the floppy disk, a stepping motor for moving the carriage assembly along the predetermined radial direction, and a spindle motor for rotatably driving the magnetic recording medium with the floppy disk held. The spindle motor is one of direct-drive (DD) motors.

In recent years, the above-mentioned portable electronic apparatuses are more and more improved to be thinned. Following such improvement, the floppy disk drives mounted or loaded therein have also improved to be thinned. With thinning of the floppy disk drive, it is desired to miniaturize the floppy disk drive in a back-and-forth size. To achieve the thinning and the miniaturizing of the floppy disk drive, various regulations (restrictions) are imposed on parts constituting the floppy disk drive. That is, inasmuch as there are a lot of restrictions caused by omitting a space (thinning), a margin of design has a tendency to become smaller.

For example, it is possible for a thick floppy disk drive to construct, as one part, an eject shutter arm and an eject plate. The eject shutter arm is for opening and closing a shutter of the floppy disk inserted in the floppy disk drive. The eject lever is for controlling a sliding operation in an eject plate for ejecting the inserted floppy disk.

On the other hand, it is necessary for a thin floppy disk drive to construct, as different parts, the eject shutter arm and the eject plate. In this event, the eject shutter arm is rotatably mounted on a disk holder for holding the floppy disk while the eject lever is rotatably mounted on a main frame. The eject shutter arm has a sufficient long stroke (that is, a rotatable range of a wider rotation angle) for opening and closing the shutter of the floppy disk. On the other hand, the eject lever has a short stroke (that is, a rotatable range of a narrower rotation angle). This is because the eject lever may only slide the eject plate when the floppy disk is inserted or loaded in the floppy disk drive.

More specifically, when the floppy disk is inserted or loaded in the thin floppy disk drive, a top end of the eject lever is engaged with an upper end of a right side edge of the shutter of the floppy disk, and the shutter gradually opens by rotation of the eject shutter arm in opposition to an urging force due to a shutter arm urging arrangement. Subsequently, just before the floppy disk is substantially completely received in the thin floppy disk drive with the shutter sufficiently opened by the eject shutter arm, a top end of the eject lever is engaged with a front edge of the floppy disk. When the floppy disk is further pushed in the thin floppy disk drive, the eject lever rotates in opposition to an urging force of a lever urging arrangement thereof, an engagement between an eject stop part of the eject lever and a plate stopper portion of the eject plate is released, and thereby the eject plate slightly slides in the forward direction (in the opposite direction of an insertion direction). This is because the eject plate is urged by eject springs in the forward direction. On the other hand, inasmuch as the disk holder is movably mounted in the main frame up and down, the disk holder comes down when eject plate slides in the forward direction. This is because projection pins formed on holder side walls of the disk holder are inserted in guide slots formed in plate side walls of the eject plate. In addition, inasmuch as the eject plate slightly slides in the forward direction, an eject bottom also slightly projects in the forward direction.

At any rate, when the floppy disk is inserted in the thin floppy disk drive, the shutter of the floppy disk opens, the floppy disk comes down, and a magnetic recording medium of the floppy disk is put between a pair of upper and lower magnetic heads mounted on a carriage assembly at a top part thereof.

As described above, in the thin floppy disk drive, the eject lever has the rotatable range of the narrower rotation angle (the short stroke). It will be assumed that a shock is given in the thin floppy disk drive in a seek direction of the magnetic heads in a state where the floppy disk is not inserted in the thin floppy disk drive. In this event, as a reaction, the eject lever rotatably moves in opposition to the urging force of the lever urging arrangement, and it may result in releasing the engagement between the eject stop part of the eject lever and the plate stopper portion of the eject plate. That is, the eject lever may erroneously operate. If such an event happens, the eject plate slightly slides in the forward direction although the floppy disk is not inserted in the thin floppy disk drive and then the disk holder comes down. This is because the eject lever has the rotatable range of the narrower rotation angle (the short stroke) and the eject lever easily rotates at the narrower rotation angle in spite of a little shock for the thin floppy disk drive.

At any rate, it is impossible to insert the floppy disk in the thin floppy disk drive once the disk holder comes down.

SUMMARY OF THE INVENTION

It is therefore an object of the present invention to provide a thin floppy disk drive which is capable of preventing an erroneous operation in an eject lever.

It is another object of the present invention to provide a thin floppy disk drive of the type described, which is capable of solving the above-mentioned problem without increasing the number of parts.

Other objects of this invention will become clear as the description proceeds.

On describing the gist of an aspect of this invention, it is possible to be understood that a thin floppy disk drive comprises a main frame in which a floppy disk having a shutter is inserted. Mounted on said main frame slidably backward and forward, an eject plate ejects the floppy disk inserted in the main frame. The eject plate has a plate stopper portion. Mounted in the main frame, a disk holder holds the floppy disk. The disk holder moves up and down when the eject plate slides backward and forward. Rotatably mounted on the disk holder, a disk shutter arm opens and closes the shutter of the floppy disk. Rotatably mounted on the main frame, an eject lever has an eject stop part engaged with the plate stopper portion of the eject plate. The eject lever makes the eject plate slide forwards by releasing engagement by the eject stop part to make the disk holder come down when the floppy disk is inserted in the thin floppy disk drive. The eject stop part of the eject lever is engaged with the plate stopper portion of the eject plate when the disk holder comes up on eject operation.

According to the aspect of this invention, the eject lever has an eject protrusion. The disk shutter arm has a shutter hook part engaged with the eject protrusion so as to control a rotation operation of the eject lever when the floppy disk is not inserted in the thin floppy disk drive. It is therefore possible to prevent the elect lever from rotating over a predetermined rotation angle as far as the floppy disk is not inserted in the thin floppy disk drive.

BRIEF DESCRIPTION OF THE DRAWING:

FIG. 6A is a plan view of an eject lever for use in the thin floppy disk drive illustrated in FIG. 1A;

FIG. 6B is a right side view of the eject lever illustrated in FIG. 6A;

FIG. 6C is a rear view of the eject lever illustrated in FIG. 6A;

DESCRIPTION OF THE PREFERRED EMBODIMENT

Figures 1A, 1B:
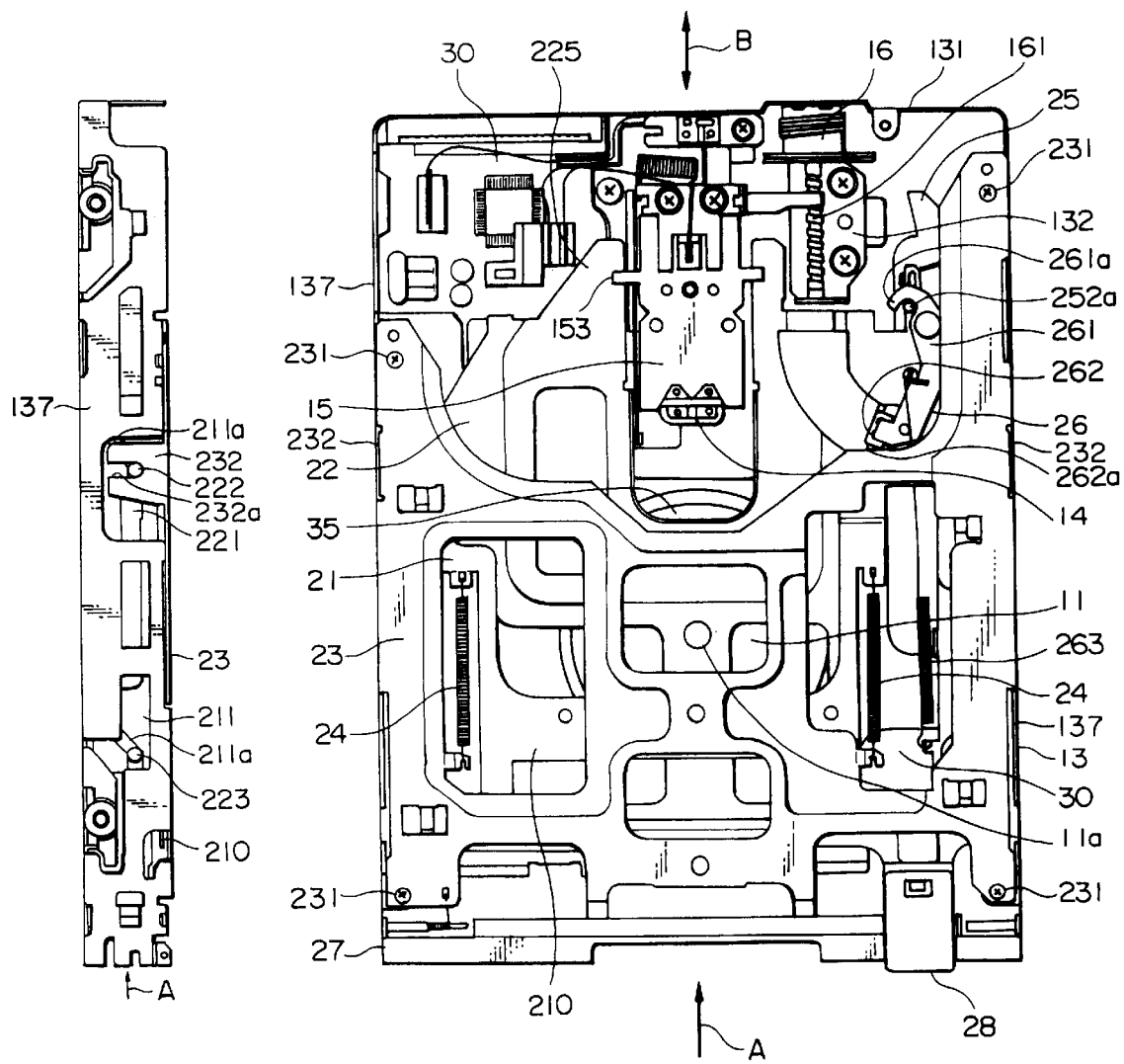
FIGS. 1A is a plan view of a thin floppy disk drive according an embodiment of this invention in a state where a floppy disk is not inserted therein.
FIG. 1B is a left side view of the thin floppy disk drive illustrated in FIG. 1A.
Figure 2:
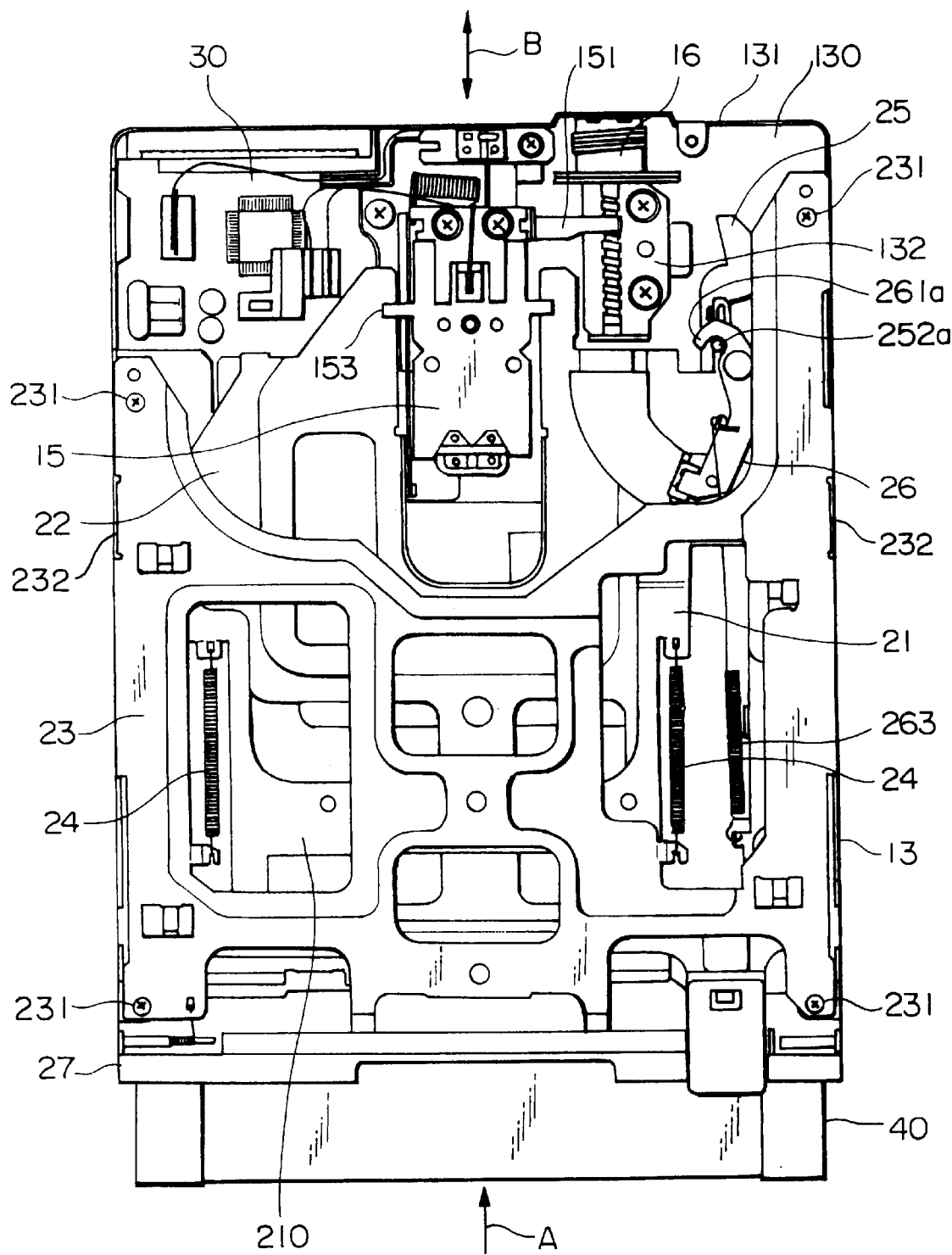
FIG. 2 is a plan view of the thin floppy disk drive illustrated in FIG. 1A in a state while the floppy disk is inserted therein.
Figures 3A, 3B:
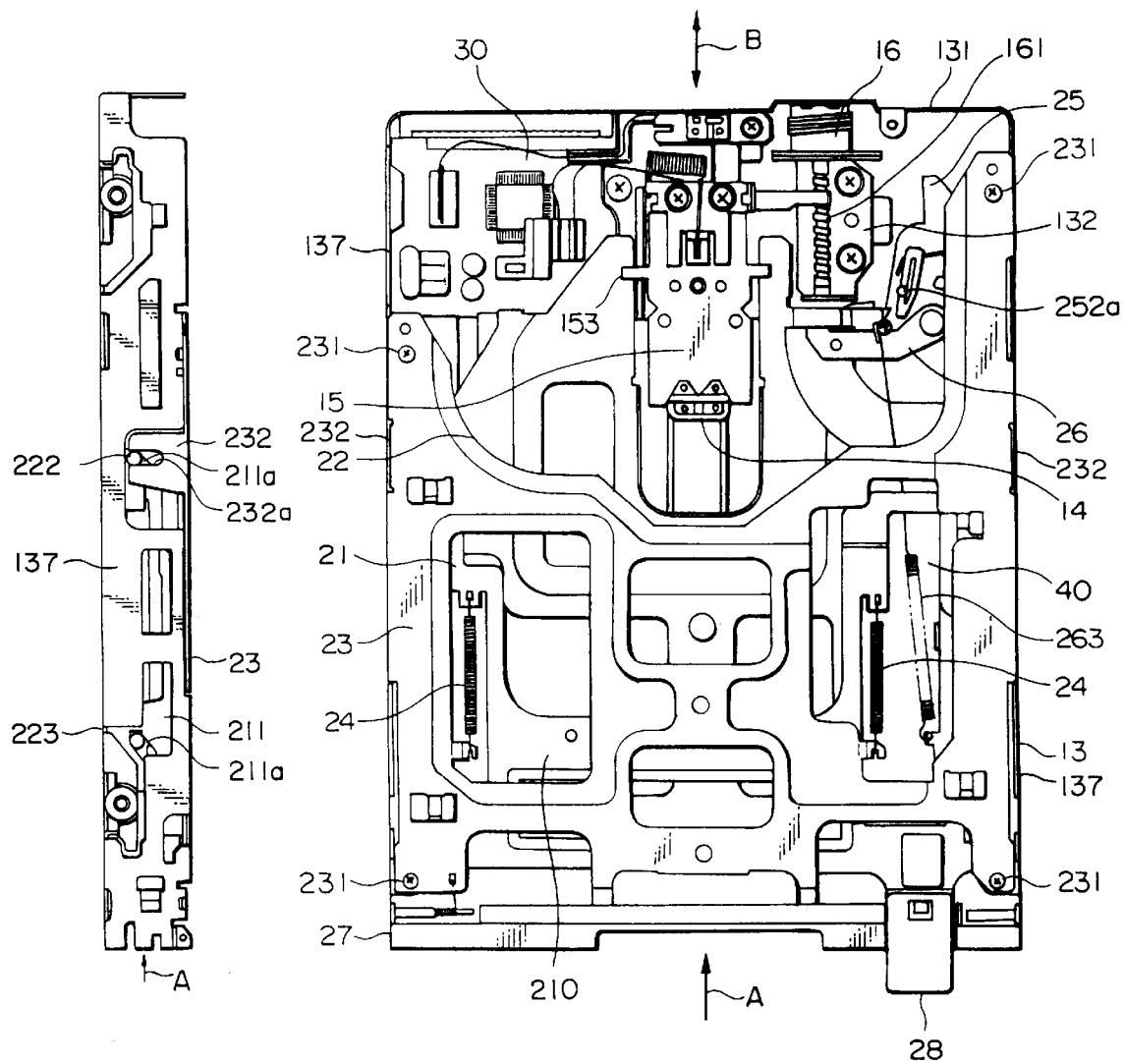
FIG. 3A is a plan view of the thin floppy disk drive illustrated in FIG. 1A in a state where the floppy disk is completely received therein.
FIG. 3B is a left side view of the thin floppy disk drive illustrated in FIG. 3A.

Referring to FIGS. 1A, 1B, 2, 3A, and 3B, the description will proceed to a thin floppy disk drive according to an embodiment of this invention. The illustrated thin floppy disk drive is a floppy disk drive of a 3.5-inch type for driving a floppy disk 40 of a 3.5-inch type which will later described. FIG.1A is a plan view of the thin floppy disk drive in a state where the floppy disk 40 is not inserted therein. FIG. 1B is a left side view of the thin floppy disk drive illustrated in FIG. 1A. FIG. 2 is a plan view of the thin floppy disk drive in a state while the floppy disk 40 is inserted therein. FIG. 3A is a plan view of the thin floppy disk drive in a state where the floppy disk 40 is completely received therein. FIG. 3B is a left side view of the thin floppy disk drive illustrated in FIG. 3A. Each of FIGS. 1A, 1B, 2, 3A, and 3A shows a state where an upper cover (not shown) is removed from the thin floppy disk drive.

The floppy disk 40 is inserted or loaded in the thin floppy disk drive from a direction indicated by an arrow A in FIGS. 1A through 3B. The loaded floppy disk 40 is held on a disk table 11 having a rotation axis 11a. In this event, the rotation axis 11a coincides with a center axis of the floppy disk 40. In the manner which will later be described, the disk table 11 is rotatably supported on a motor main surface of a motor frame mounted on a frame main surface 130 of a main frame 13. Accordingly, the rotation axis 11a of the disk table 11 has an axial direction (i.e. a direction perpendicular to the plane of the drawing sheet) which extends in parallel with a thick direction of the main frame 13. The disk table 11 is rotatably driven by a spindle motor or a direct-drive (DD) motor 35 mounted on the motor main surface of the motor frame, thereby a magnetic recording medium of the floppy disk 40 rotates. In addition, on the frame main surface 130 of the main frame 13 and on the motor main surface of the motor frame is attached a printed substrate 30 on which a number of electronic parts (not shown) are mounted.

The thin floppy disk drive comprises a pair of upper and lower magnetic heads 14 (only the upper magnetic head is illustrated) for reading/writing data from/to the magnetic recording medium of the floppy disk 40. The magnetic heads 14 are supported in a carriage assembly 15 at a tip thereof that is laid in the thin floppy disk drive at a rear side. That is, the carriage assembly 15 comprises an upper carriage for supporting the upper magnetic head 14 and a lower carriage for supporting the lower magnetic head. The carriage assembly 15 is disposed over the frame main surface 130 of the main frame 13 and is apart from the frame main surface 130 of the main frame 13 in the manner which will later be described. The carriage assembly 15 supports the magnetic heads 14 movably along a predetermined radial direction (i.e. a direction indicated by an arrow B in FIGS. 1A, 2, and 3A) to the floppy disk 40.

In addition, the main frame 13 has at the rear side a frame rear wall 131 on which a stepping motor 16 is fixed. The stepping motor 16 linearly drives the carriage assembly 15 along the predetermined radial direction B. More specifically, the stepping motor 16 has an axis of rotation (a driving shaft) 161 which extends in parallel with the predetermined radial direction B and which is threaded to form a male screw. The driving shaft 161 has a tip which penetrates a hole bored in a pedestal portion 132 attached on the frame main surface 130 of the main frame 13. At any rate, the driving shaft 161 of the stepping motor 16 is defined so as to extend in parallel with the predetermined radial direction B and the tip thereof is rotatably held.

On the other hand, the carriage assembly 15 comprises an arm 151 which extends from the lower carriage to the driving shaft 161. The arm 151 has a leading edge which is engaged with the root in the male screw of the driving shaft 161. Therefore, when the driving shaft 161 of the stepping motor 16 rotates, the leading edge of the arm 151 moves along the root in the male screw of the driving shaft 161, thereby moving the carriage assembly 15 along the predetermined radial direction B. At any rate, the stepping motor 16 serves as a driving arrangement for moving the carriage assembly 15 along the predetermined radial direction B.

Inasmuch as the driving shaft 161 of the stepping motor 16 is disposed at one side of the carriage assembly 15, the one side of the carriage assembly 15 is movably supported by the driving shaft 161 and is apart from the frame main surface 130 of the main frame 13. However, because support occurs by the driving shaft 161, it is difficult to dispose the whole of the carriage assembly 15 apart from the frame main surface 130 of the main frame 13. For this purpose, a guide bar (not shown) guides the carriage assembly 15 with the carriage assembly 15 supported at another side thereof. That is, the guide bar is opposed to the driving shaft 161 of the stepping motor 16 with the carriage assembly 15 inserted between the guide bar and the driving shaft 161. The guide bar extends in parallel with the predetermined radial direction B and has one end and another end which are mounted on the frame main surface 130 of the main frame 13 in the manner which later be described. The guide bar guides the carriage assembly 15 along the predetermined radial direction B. As a result, the whole of the carriage assembly 15 is disposed apart from the frame main surface 130 of the main frame 13.

In addition, a flexible printed circuit (FPC) (not shown) extends from the carriage assembly 15 to the vicinity of the guide bar and the flexible printed circuit is electrically connected to the printed substrate 30 attached to the frame main surface 130 of the main frame 13.

Figures 4A, 4B:
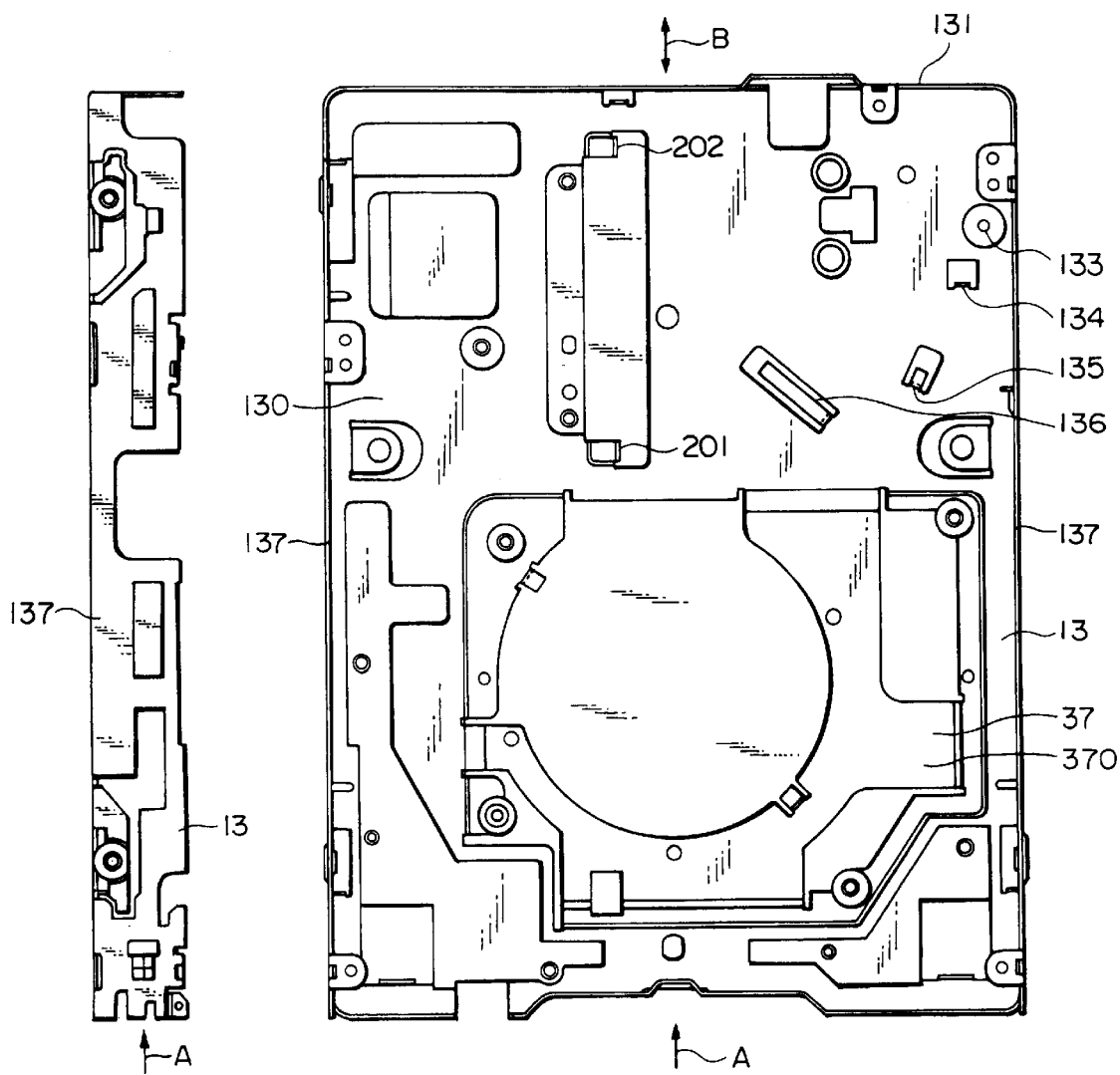
FIG. 4A is a plan view of a main frame for use in the thin floppy disk drive illustrated in FIG. 1A.
FIG. 4B is a left side view of the main frame illustrated in FIG. 4A.

FIG. 4A is a plan view of the main frame 13 while FIG. 4B is a left side view of the main frame 13. The guide bar is clamped on the frame main surface 130 of the main frame 13 by a guide bar clamp (not shown). The guide bar clamp is fixed on the frame main surface of the main frame 13 at both portions thereof by binding small screws (not shown).

Inasmuch as the guide bar clamp merely clamps the guide bar, the guide bar is not mounted on the frame main surface 130 of the main frame 13 by the guide bar clamp alone. For this purpose, a pair of locating members for locating both ends of the guide bar is needed. As the pair of locating members, a pair of bent pieces 201 and 202 is used which are formed by cutting and bending parts of the main frame 13.

The main frame 13 further has a pair of frame side walls 137 which is formed at both side ends of the frame main surface 130 and which is opposed to each other.

On the frame main surface 130 of the main frame 13, the motor frame depicted at 37 is mounted on which the spindle motor 35 (FIG. 1A) is mounted on the motor main surface depicted at 370 thereof.

Turning back to FIGS. 1A, 1B, 2, 3A, and 3B, the lower carriage of the carriage assembly 15 serves as a supporting frame for supporting the carriage assembly 15 slidably along the guide bar. The lower carriage has a projecting portion (not shown) which projects into the frame main surface 130 of the main frame 13 at a side of the guide bar. The guide bar is slidably fitted in the projection portion.

The thin floppy disk drive further comprises an eject plate 21 and a disk holder 22. Each of the main frame 13, the eject plate 21, and the disk holder 22 is formed to perform bending, press working, and bending of a metal plate.

The eject plate 21 is mounted on the frame main surface 130 of the main frame 13 slidably along the insertion direction A of the floppy disk 40 and an opposite direction (i.e. backward and forward).

As shown in FIGS. 1A, 1B, 3A, and 3B, the eject plate 21 comprises a plate main surface 210 opposed to the frame main surface 130 of the main frame 13 with a space left therebetween, a pair of plate side walls 211 arranged at both side ends of the plate main surface 210 opposite to each other in a transversal direction. That is, the plate side walls 211 are faced to the frame side walls 137 of the main frame 13 in one-to-one correspondence. Each of the plate side walls 211 has a pair of guide slots 211a formed on a front side and a rear side thereof. On the plate main surface 210 of the eject plate 21, a plate stopper portion (which will later be described) is formed at a lower side thereof. The plate stopper portion engages with an eject stop part of an eject lever which will later be described.

Figures 5A, 5B:
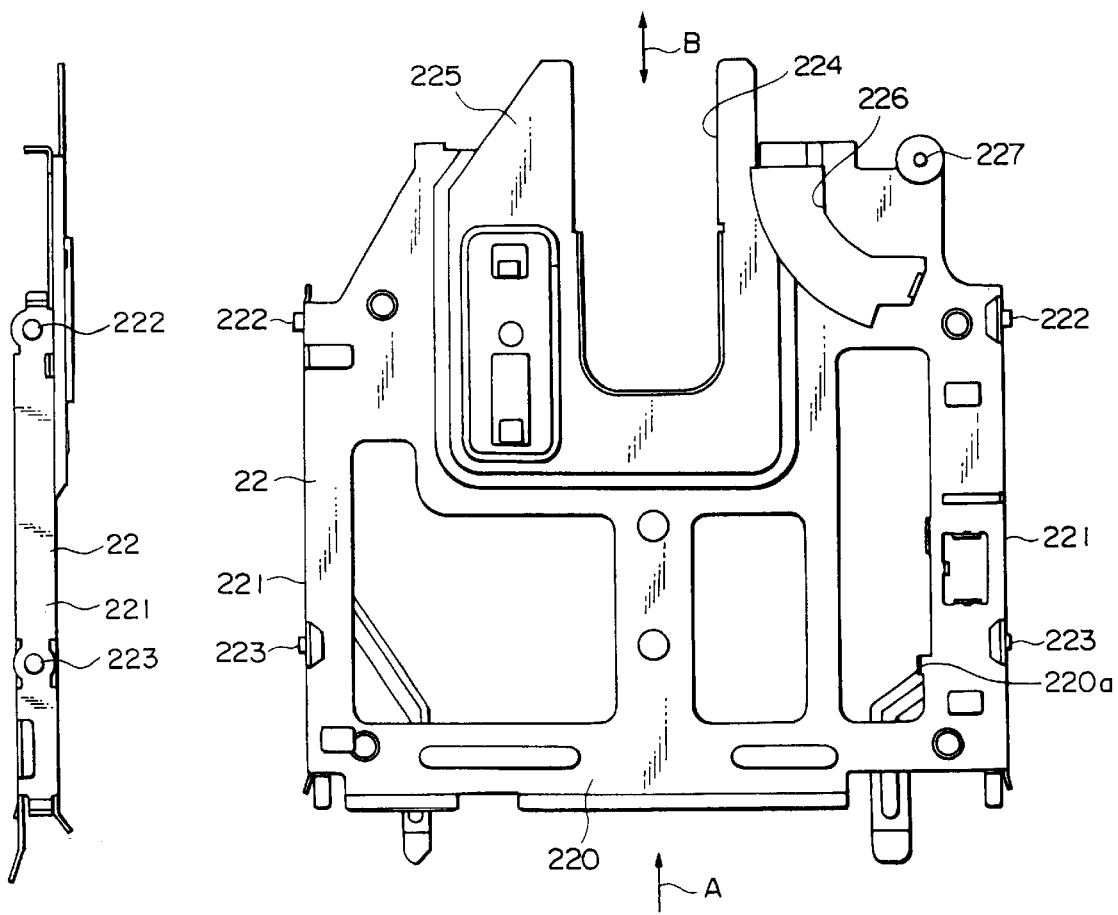
FIG. 5A is a plan view of a disk holder for use in the thin floppy disk drive illustrated in FIG. 1A.
FIG. 5B is a left side view of the disk holder illustrated in FIG. 5A.

FIG. 5A is a plan view of the disk holder 22 while FIG. 5B is a left side view of the disk holder 22. The disk holder 22 is disposed under the plate main surface 210 of the eject plate 21. The disk holder 22 comprises a holder principal surface 220 and a pair of holder side walls 221 which is formed at both side ends of the holder principal surface 220 and which is opposed to each other. That is, the holder side walls 221 are faced to the plate side walls 211 of the eject plate 21 in one-to-one correspondence. Each of the both holder side walls 221 is provided with a pair of projection pins 222 and 223 formed on a front side and a rear side thereof, respectively, to protrude outward. The projection pins 222 and 223 are inserted in the guide slits 211a formed on the plate side walls 211 of the eject plate 21, as illustrated in FIGS. 1B and 3B.

In addition, the disk holder 22 has a rectangular opening section 224 at a center portion in a back or rear side in the insertion direction A. The rectangular opening section 224 is laid in a corresponding position of the upper carriage of the carriage assembly 15 and extends in the predetermined radial direction B. So as to enclose the opening section 224, a U-shaped swelled portion 225 is formed where the holder principal surface 220 of the disk holder 22 swells at periphery upwards.

On the other hand, the carriage assembly 15 comprises a pair of side arms 153 (FIGS. 1A, 2, 3A) which extends in a lateral direction perpendicular to a longitudinal direction of the carriage assembly 15. The side arms 153 are located on or over the swelled portion 225. In the manner which will later be described, in a state where the floppy disk 40 is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

As shown in FIGS. 1A, 2, and 3A, an upper surface of the main frame 13 is covered by a sub-frame 23 which is fixed on the main frame 13 by screws 231 at four corners. Between the sub-frame 23 and the plate main surface 210 of the eject plate 21, a pair of eject springs 24 is bridged.

In addition, as shown in FIGS. 1B and 3B, the sub-frame 23 has a pair of pin regulation pieces 232 which is formed at both side ends thereof by a rectangular folding so as to extend downward. Each pin regulation piece 232 has a pin regulation ditch 232a which linearly extends upward. Inasmuch as the above-mentioned projection pins 222 are inserted in the pin regulation ditch 232a though the guide slots 211a, the disk holder 22 is positioned against the main frame 13 in the insertion direction A and the disk holder 22 is reciprocated along the axial direction of the rotation axis 11a of the disk table 11.

As shown in FIGS. 1A, 2, and 3A, in the vicinity of the carriage assembly 15 on the main frame 13, the eject lever depicted at 25 is formed to rotatably move.

FIGS. 6A, 6B, and 6C collectively show structure of the eject lever 25. FIG. 6A is a plan view of the eject lever 25, FIG. 6B is a right side view of the eject lever 25, and FIG. 6C is a rear view of the eject lever 25. On the main frame 13, a rod pin (not shown) stands up which extends upwards from the frame main surface 130 thereof at a predetermined position 133 (FIG. 4A) in right side and forward of the frame main surface 130. The eject lever 25 comprises a cylindrical part 250 in which the rod pin is inserted, an eject arm part (an eject lever part) 251 extending from the cylindrical part 240 in a radial direction, an eject projection part 252 which is formed in the eject arm part 251 and which extends upwards. The eject lever 25 further comprises the eject stop part depicted at 253 which has an arc-shaped and which extends from a side of a free end of the eject arm part 251 in a circumferential direction. In the eject lever 25, an eject lever spring (not shown) is attached around the cylindrical part 250 and the eject lever spring urges the eject lever 25 in a counterclockwise direction on the plane of the drawing sheet.

The eject projection part 252 of the eject, lever 25 is engaged with a front edge of the floppy disk 40 (which will later be described) to control a sliding operation of the eject plate 21 backward and forward.

The eject lever 25 further comprises a tongue part 254 which extends in parallel to the eject arm part 251 toward the spindle motor 35 (FIG.1A). The tongue part 254 has a tip part 254a which is swelled. The tip part 254a is for avoiding crashing the floppy disk 40 with the lower magnetic head when the floppy disk 40 is loaded in the thin floppy disk drive.

In addition, as shown in FIG. 4A, the main frame 13 has bent portions 134, 135, and 136 which are formed by cutting and bending of the main frame 13 on the side of the frame main surface thereof. By the bend portions 134 to 136, a counterclockwise rotation motion of the eject lever 25 is controlled or regulated. Under the bent portion 136, the tongue part 254 is disposed to prevent the tongue part 254 from being apart from the frame main surface of the main frame 13.

In addition, the eject projection part 252 of the eject lever 25 further has an eject protrusion 252a which protrudes upwards. The eject protrusion 252a is engaged with a shutter hook part of a disk shutter arm which will later be described.

The eject lever 25 further comprises the eject stopper part depicted at 255. The eject stopper part 255 is for preventing the disk shutter arm from returning back to an initial position by engaging with the later-described disk shutter arm when the floppy disk 40 is completely received in the thin floppy disk drive.

Figure 7:
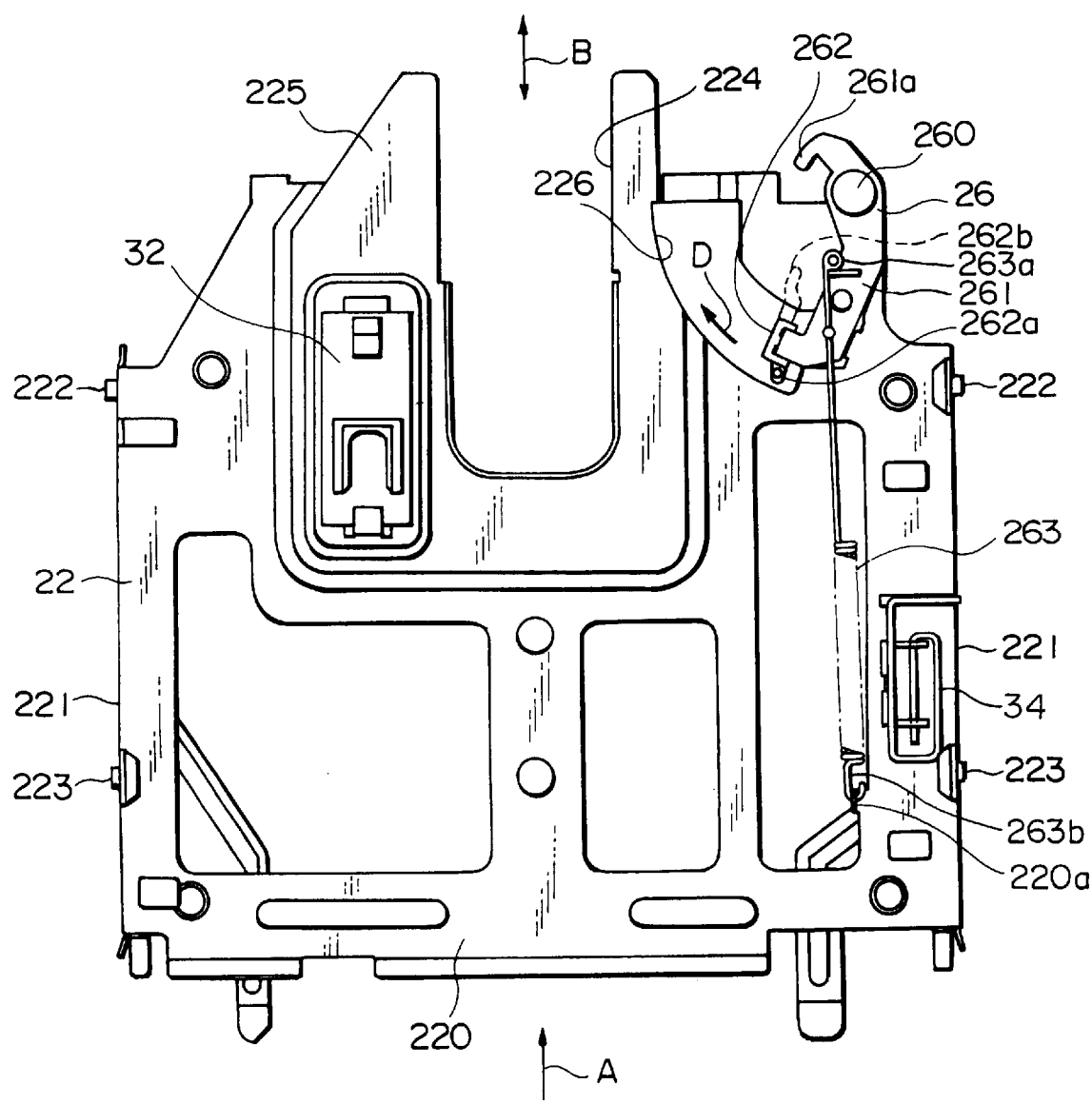
FIG. 7 is a plan view of a disk holder assembly for use in the thin floppy disk drive illustrated in FIG. 1A.

Referring to FIG. 7 in addition to FIG. 5A, the disk holder 22 has a right-upper corner part 227 on which the disk shutter arm depicted at 26 is rotatably mounted around a shutter arm pin 260. The disk shutter arm 26 comprises a shutter arm part (a shutter lever part) 261 extending from the right-upper corner part 227 in a radial direction and a shutter arm bush 262 which is mounted on a tip portion of the shutter arm part 261 and which extends downwards.

Figure 8A:
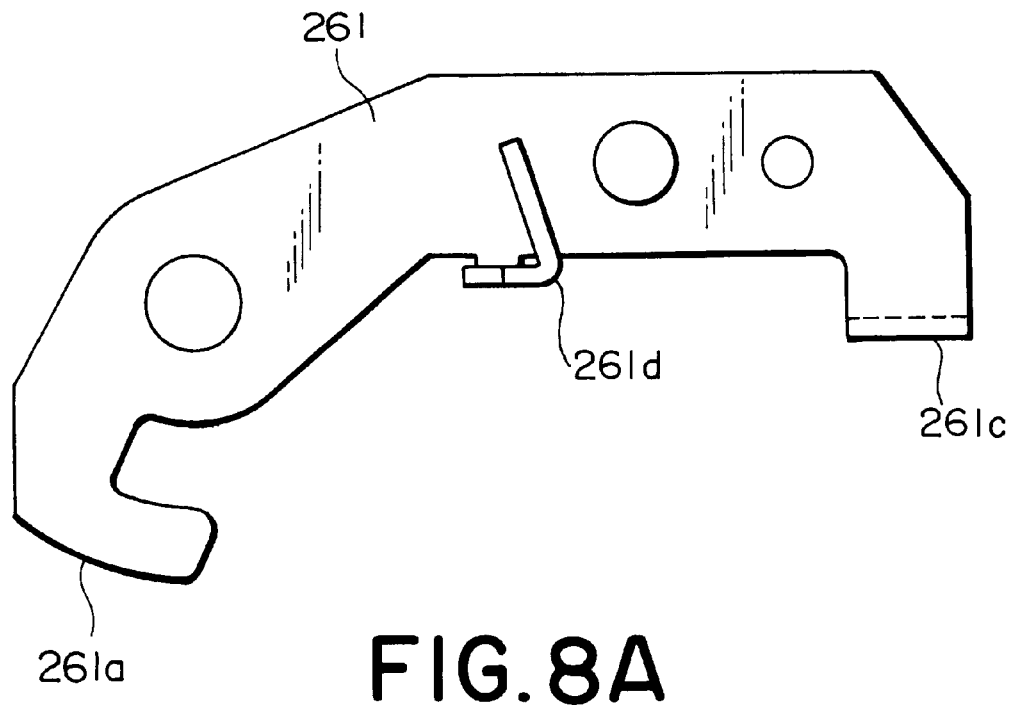
FIG. 8A is a plan view of a shutter arm part of a disk shutter arm for use in the thin floppy disk drive illustrated in FIG. 1A.
Figure 8B:
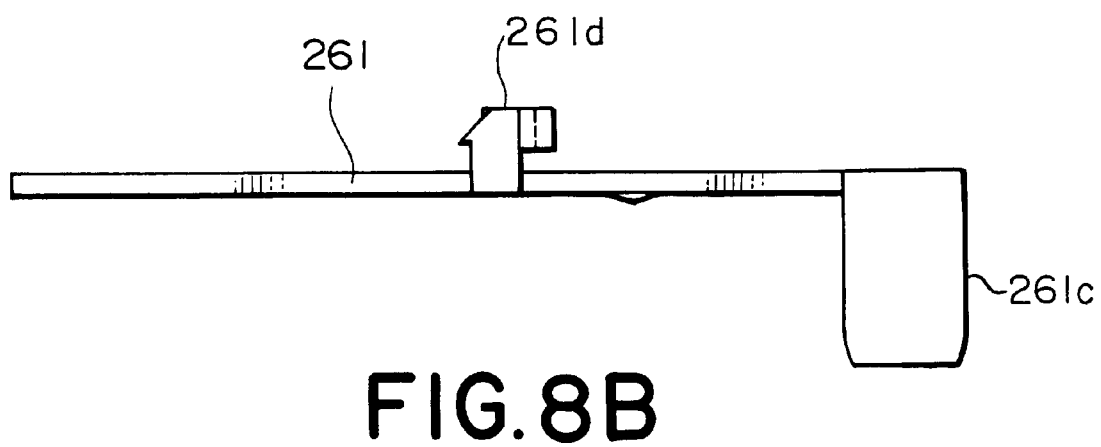
FIG. 8B is a front view of the shutter arm part illustrated in FIG. 8A.
Figure 9A:
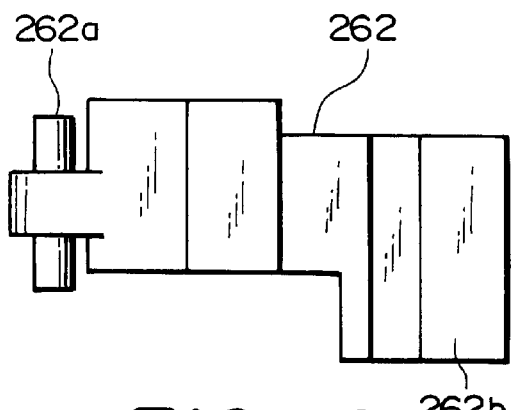
FIG. 9A is a front view of a shutter arm bush of the disk shutter arm for use in the thin floppy disk drive illustrated in FIG.1A.
Figure 9B:
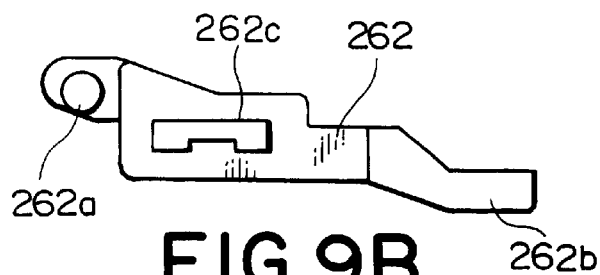
FIG. 9B is a bottom view of the shutter arm bush illustrated in FIG. 9A.
Figure 9C:
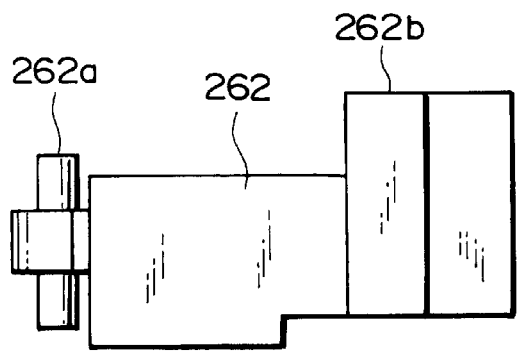
FIG. 9C is a rear view of the shtter arm bush illustrated in FIG. 9A.
Figure 9D:
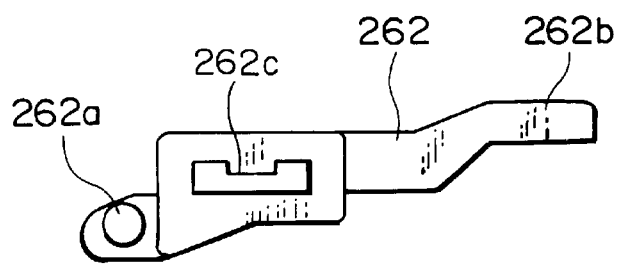
FIG. 9D is a plan view of the shtter arm bush illustrated in FIG. 9A.

FIGS. 8A and 8B collectively show structure of the shutter arm part 261 while FIGS. 9A, 9B, 9C, and 9D collectively show structure of the shutter arm bush 262. FIG. 8A is a plan view of the shutter arm part 261 and FIG. 8B is a front view of the shutter arm part 261. FIG. 9A is a front view of the shutter arm bush 262, FIG. 9B is a bottom view of the shutter arm bush 262, FIG. 9C is a rear view of the shutter arm bush 262, and FIG. 9D is a plan view of the shutter arm bush 262.

The shutter arm part 261 has the shutter hook part depicted at 261a which engages with the eject protrusion 252a of the above-mentioned eject lever 25. As shown in FIG. 7, the shutter arm bush 262 is freely inserted in the opening part 226 of the above-mentioned disk holder 22. In addition, an tip part 262a of the shutter arm bush 262 is engaged with an upper end of a right-hand side edge of the shutter of the later-described floppy disk 40 to control opening and closing of the shutter. The shutter arm bush 262 further has a shutter projection part 262b. The shutter projection part 262b is engaged with the eject stopper part 255 of the above-mentioned eject lever 25 when the floppy disk drive 40 is completely received in the thin floppy disk drive.

The shutter arm part 261 further has a shutter rotation opening 261b through which the shutter arm pin 260 (FIG. 7) is inserted in the right-upper corner part 227 (FIG. 5A) of the disk holder 22. The shutter arm part 261 has a shutter insertion part 261c which projects downwards. The shutter arm bush 262 has a shutter insertion opening 262c. The shutter insertion part 261c of the shutter arm part 261 is inserted in the shutter insertion opening 262c of the shutter arm bush 262. The shutter arm part 261 has a shutter engaging part 261d which projects upwards.

As illustrated in FIG. 7, the disk shutter arm 26 is urged by a shutter arm spring 263 around the shutter arm pin 260 counterclockwise. That is, the shutter arm spring 263 is bridged between the shutter arm part 261 of the disk shutter arm 26 and the disk holder 22. In other words, the shutter arm spring 263 has an end 263a engaged with the shutter engaging part 261d of the shutter arm part 261 and another end 263b engaged with a holder hook part 220a which projects from the holder principal surface 220 of the disk holder 22 upwards. An upper magnetic head guard 32 is mounted on the swelled portion 225 of the disk holder 22. In addition, a reverse direction insertion preventing spring 34 is mounted in the holder principal surface 220 of the disk holder 22 at right side. A combination of the disk holder 22, the disk shutter arm 26, the shutter arm pin 260, the upper magnetic head guard 32, and the reverse direction insertion preventing spring 34 constitutes a disk holder assembly.

Turning back to FIGS. 1A, 2, and 3A, the main frame 13 has a front end section on which a front panel or bezel 27 is attached. The front bezel 27 has a bezel opening (not shown) for taking the flexible disk 40 in and out and a bezel door (not shown) for opening and shutting the bezel opening. Into the front bezel 27, an eject button 28 projects movably backward and forward. The eject button 28 is fitted in a protrusion part (not shown) which protrudes from a front end of the eject plate 21 forwards.

Figure 10:
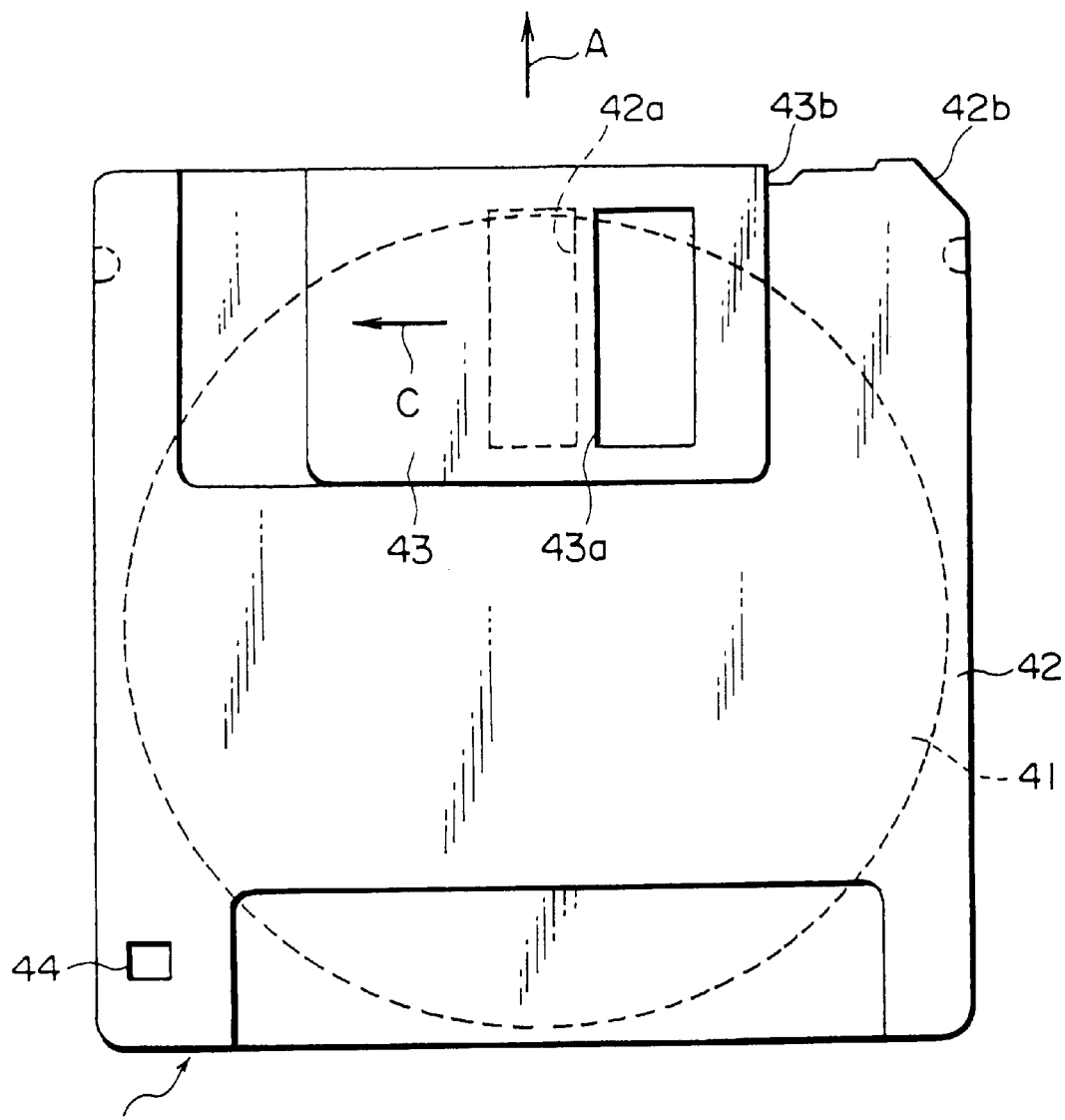
FIG. 10 is a plan view of a floppy disk driven by the floppy disk drive illustrated in FIG. 1A.

Referring to FIG. 10, the description will proceed to the floppy disk (FD) 40 driven by the thin floppy disk drive (FDD) illustrated in FIGS. 1A through 3B. The illustrated floppy disk 40 comprises a disk-shaped magnetic recording medium 41, a shell 42 for covering or receiving the magnetic recording medium 41, and the shutter depicted at 43 slidably in an opening direction indicated by an arrow C in FIG.10. The shutter 43 has a shutter window 43a. The shutter 43 is urged by a spring member (not shown) in a closing direction reverse to the opening direction C. The shell 42 has a head window 42a to enable an access of the magnetic recording medium 41 by the magnetic heads 14 of the abovementioned thin floppy disk drive.

In a state where the floppy disk 40 is not loaded in the thin floppy disk drive, the head window 42a is covered by the shutter 43 as shown in FIG. 10. When the floppy disk 40 is loaded in the thin floppy disk drive, the tip part 262a (FIGS. 9A through 9D) of the shutter arm bush 262 in the disk shutter arm 26 engages with the upper end 43b of the right-hand side edge of the shutter 43 to slide the shutter 43 in the opening direction C.

The shell 42 has a chamfered portion 42b at a corner portion in upper and right-hand side thereof. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A of FIG. 10.

In the manner known in the art, in the floppy disk 40 driven by the thin floppy disk drive, the magnetic recording medium 41 accessed by the magnetic heads 14 (FIGS. 1A and 2) has a plurality of tracks on a surface thereof that serve as paths for recording data and that are formed in a concentric circle along a radial direction. The floppy disk 40 has eighty tracks on one side which include the most outer circumference track (the most end track) TR00 and the most inner circumference track TR79.

Figure 11:
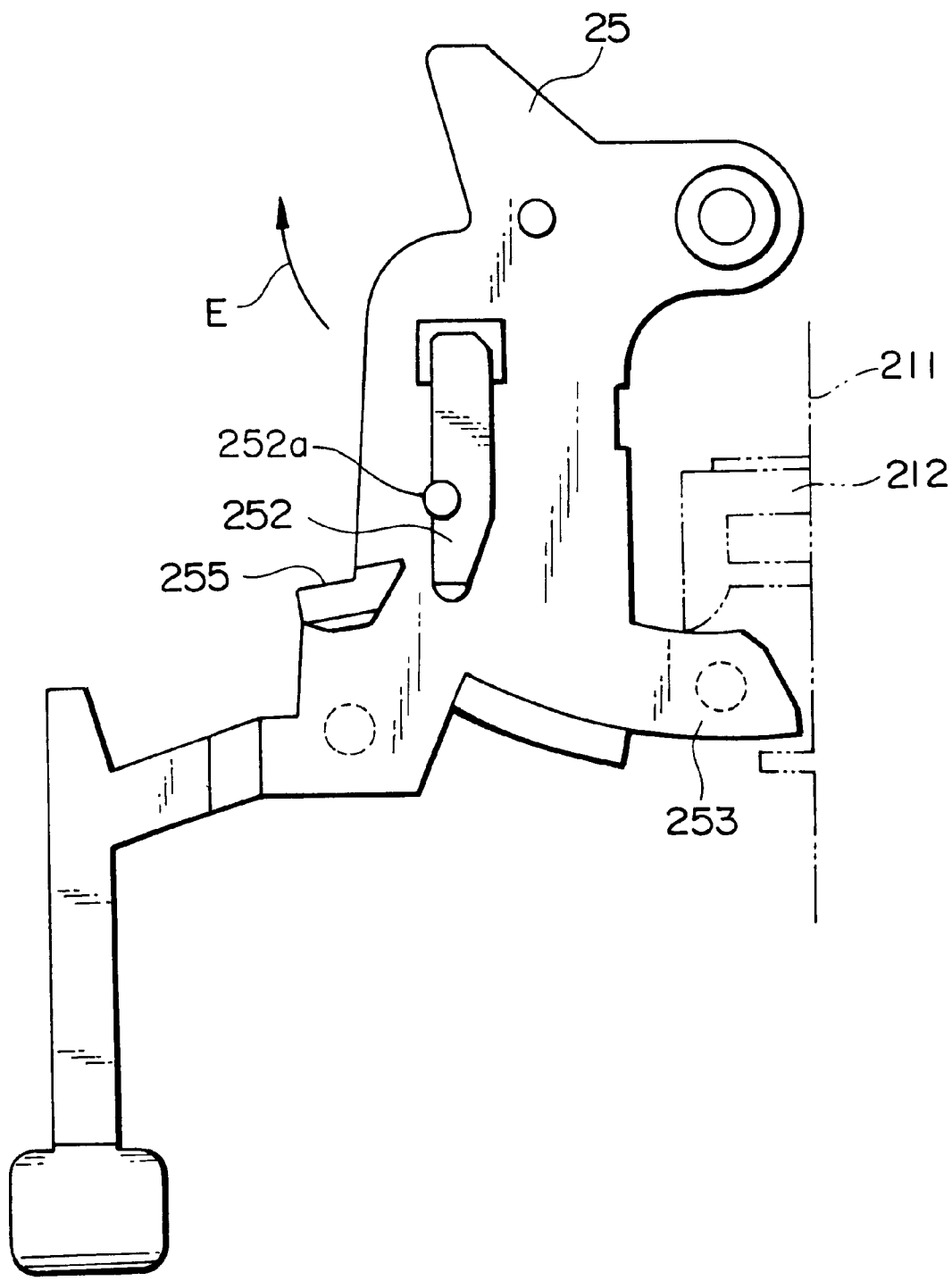
FIG. 11 is a plan view showing a relationship between an eject stop part of the elect lever illustrated in FIG. 6A and a plate stopper portion formed on a plate main surface of an eject plate for use in the thin floppy disk drive illustrated in FIG. 1A.

FIG. 11 illustrates a relationship between the plate stopper portion depicted at 212 formed on the plate main surface 210 of the eject plate 21 at the lower side thereof and the eject stop part 253 of the eject lever 25. As shown in FIG. 11, in a state where the floppy disk 40 is inserted in the thin floppy disk drive, the plate stopper portion 212 of the eject plate 21 is engaged with the eject stop part 253 of the eject lever 25.

With this structure, when the floppy disk 40 is not loaded in the thin floppy disk drive, the shutter hook part 261a of the disk shutter arm 26 is engaged with the eject protrusion 252a of the eject lever 25 so as to control or regulate the rotation movement of the eject lever 25 as shown in FIG. 1A. As a result, it is possible to prevent the eject lever 25 from rotating at a predetermined rotation angle or more as far as the floppy disk 40 is not loaded in the thin floppy disk drive. In other words, it is possible to prevent the eject lever 25 from erroneously operating although shock or impact is given in the thin floppy disk drive. In addition, such an erroneous operation preventing structure for the elect lever 25 is merely implemented by providing the eject lever 25 with the eject protrusion 252a and by providing the disk shutter arm 26 with the shutter hook part 261a. Accordingly, it is possible to improve reliability of the thin floppy disk drive without excessively costing up.

Referring now to FIGS. 1A through 11, the description will proceed to operation in a case where the floppy disk 40 is loaded in the thin floppy disk drive and operation in a case where the floppy disk 40 is ejected from thin floppy disk drive. The description will first be made about the operation on loading the floppy disk and subsequently the description will be made about the operation on ejecting the floppy disk 40.

Before the floppy disk 40 is loaded in the thin floppy disk drive, the eject lever 25 and the disk shutter arm 26 are put into a state illustrated in FIG. 1A. That is, the eject protrusion 252a of the eject lever 25 is engaged with the shutter hook part 261a of the disk shutter arm 26. In this state, the plate stopper portion 212 of the eject palate 21 is engaged with the eject stop part 253 of the eject lever 25, as illustrated in FIG. 11. In addition, in this state, as illustrated in FIG. 1B, the projection pins 222 and 223 of the disk holder 22 are located in the guide slots 211a of the eject plate 21 at upper side and the disk holder 22 is put in an risen position. This risen position is a position where the floppy disk 40 can be received in the thin floppy disk drive. Furthermore, in this state, the side arms 153 of the carriage assembly 15 are engaged on the swelled portion 225 of the disk holder 22 and the upper magnetic head 14 is put in an upper position apart from the lower magnetic head.

In this state, a user holds the floppy disk 40 and inserts the floppy disk 40 in the thin floppy disk drive, as shown in FIG. 2, in the insertion direction A in a normal state with the front edge of the floppy disk 40 put to the bezel door of the front bezel 27. Thereupon, as shown in FIG. 2, an upper end 43b of the right-hand side edge of the shutter 43 engages with the tip part 262a of the shutter arm bush 262 of the disk shutter arm 26. When the floppy disk 40 is further pushed and put forward from this time instant (place) in opposition to the urging force of the shutter arm spring 263 mounted in the disk shutter arm 26, the shutter arm bush 262 of the eject shutter arm 26 moves in the opening portion 226 in a clockwise direction indicated by an arrow D of FIG. 7. Accompanied with this, the shutter 43 of the floppy disk 40 slides in the opening direction C of FIG. 10 in opposition to the urging force of the spring member. Accordingly, the shutter 43 gradually opens the head window 42a.

And then the shutter 43 of the floppy disk 40 sufficiently opens by the eject shutter arm 26. Just before the floppy disk 40 is substantially and completely received in the thin floppy disk drive, the front edge of the floppy disk 40 engages with the eject projection part 252 of the eject lever 25. In this event, inasmuch as engagement between the eject protrusion 252a of the eject lever 25 and the shutter hook part 261a of the disk shutter arm 26 is released, the eject lever 25 is put into a state to enable the eject lever 25 to rotate in the clockwise direction.

When the floppy disk 40 is further pushed and put forward in the thin floppy disk drive, the eject lever 25 rotates in a clockwise direction indicated by an arrow E of FIG. 11 in opposition to the eject lever spring mounted thereon and engagement between the eject stop part 253 of the eject lever 25 and the plate stopper part 212 of the eject plate 21. Thereby, the eject plate 21 slightly slides forwards (the opposite direction for the insertion direction A). This is because the eject plate 21 is urged by the eject springs 24 forwards.

On the other hand, inasmuch as the eject plate 21 slides forwards, the disk holder 22 comes down as shown in FIG.

3B. This is because the projection pins 222 and 223 (FIGS. 5A and 5B) formed on the holder side walls 221 of the disk holder 22 are inserted in the guide slits 211a formed in the plate side walls 211 of the eject plate 21.

Accordingly, engagement between the side arms 153 of the carriage assembly 15 and the swelled portion 225 of the disk holder 22 is released and the upper carriage of the carriage assembly 15 also comes down. As a result, the magnetic disk medium 41 of the floppy disk 40 is put between the pair of upper and lower magnetic heads 14 mounted on the carriage assembly 15 at the tip part thereof. In this event, inasmuch as the eject stopper part 255 of the eject lever 25 is engaged with the projection part 262b of the shutter arm bush 262 of the disk shutter arm 26, it is possible to prevent the disk shutter arm 26 from returning back to an original position. In addition, inasmuch as the eject plate 21 slightly slides forwards, the eject button 28 also slightly protrudes from the front bezel 27 forwards. This state is illustrated in FIGS. 3A and 3B.

Thereafter, in the manner known in the art, it is possible to read and write data from and in the magnetic disk medium 41 of the floppy disk 40 using the magnetic heads 14.

Now, the description will be made about the operation in the case where the floppy disk 40 is ejected from the disk holder 22.

In this event, the user pushes the eject button 28 in the insertion direction A backwards. Accordingly, the eject plate 21 slides on the main frame 13 in the insertion direction A backwards. With this operation, the projection pins 222 and 223 of the disk holder 22 move along the guide slits 211a of the eject plate 21 and the disk holder 22 comes up. Accordingly, the side arms 153 of the carriage assembly 15 are engaged with the swelled portion 225 of the disk holder 22 and the pair of upper and lower magnetic heads 14 supported on the carriage assembly 15 at the tip part thereof are apart from the magnetic recording medium 41 of the floppy disk 40. When the eject button 28 is furthermore pushed in the insertion direction A backwards, the disk holder 22 is put at a predetermined defined upper position and the eject lever 25 rotates counterclockwise in the opposite direction for the direction indicated by the arrow E of FIG. 11 by the urging force of the eject lever spring.

At the same time, engagement between the eject stopper part 255 of the eject lever 25 and the shutter projection part 262b of the shutter arm bush 262 of the disk shutter arm 26 is released and the disk shutter arm 26 rotates, by the urging force of the shutter arm spring 263, counterclockwise in the opposite direction to the direction indicated by the arrow D of FIG. 7. Accordingly, the floppy disk 40 received in the disk holder 22 is pushed out in the opposite direction to the insertion direction A and the floppy disk 40 is ejected from the thin floppy disk drive. In this state, inasmuch as the eject stop part 253 of the eject lever 25 is engaged with the plate stopper part 212 of the eject plate 21, it is possible to prevent the eject plate 21 from moving toward the front bezel 27.

While this invention has thus far been described in conjunction with a preferred embodiment thereof, it is to be understood that modifications will be apparent to those skilled in the art without departing from the sprit of the invention.

What is claimed is:

1. A thin floppy disk drive comprising:

a main frame in which a floppy disk having a shutter is inserted;

an eject plate, mounted on said main frame slidably backward and forward, for ejecting said floppy disk inserted in said main frame, said eject plate having a plate stopper portion;

a disk holder, mounted in said main frame, for holding said floppy disk, said disk holder moving up and down when said eject plate slides backward and forward;

a disk shutter arm, rotatably mounted on said disk holder, for opening and closing the shutter of said floppy disk; and an eject lever, rotatably mounted on said main frame, having an eject stop part engaged with the plate stopper portion of said eject plate, said eject lever making said eject plate slide forwards by releasing engagement by the eject stop part to make said disk holder come down when said floppy disk is inserted in said thin floppy disk drive, the eject stop part of said eject lever being engaged with the plate stopper portion of said eject plate when said disk holder comes up on eject operation, wherein said eject lever has an eject protrusion, said disk shutter arm having a shutter hook part engaged with the eject protrusion so as to control a rotation operation of said eject lever when said floppy disk is not inserted in said thin floppy disk drive, thereby preventing said elect lever from rotating over a predetermined rotation angle as far as said floppy disk is not inserted in said thin floppy disk drive.

2. A thin floppy disk drive as claimed in claim 1, wherein said thin floppy disk drive further comprises a sub-frame for covering an upper surface of said main frame, said sub-frame being fixed on said main frame and a pair of eject springs for bridging between said sub-frame and said eject plate.

3. A thin floppy disk drive as claimed in claim 2, wherein said disk holder is disposed under a plate main surface of said eject plate, said eject plate comprising a pair of plate side walls arranged opposite to each other in a transversal direction, each of the plate side walls having a pair of guide slots formed on a front side and a rear side thereof, said disk holder comprising a holder principal surface and a pair of holder side walls which is formed at both side ends of the holder principal surface and which is opposed to each other, each of the holder side walls having a pair of projection pins inserted in the guide slots.

4. A thin floppy disk drive as claimed in claim 3, wherein said sub-frame has a pair of pin regulation pieces which is formed at both side ends thereof by a rectangular folding so as to extend downward, each of the pin regulation pieces having a pin regulation ditch in which one of the projection pins is inserted.

5. A thin floppy disk drive as claimed in claim 3, wherein said plate stopper portion is formed on the plate main surface of said eject plate at a lower side thereof.

* * * * *